Oct. 10, 1933.   M. TIBBETTS   1,930,067
MOTOR VEHICLE
Filed Oct. 15, 1931
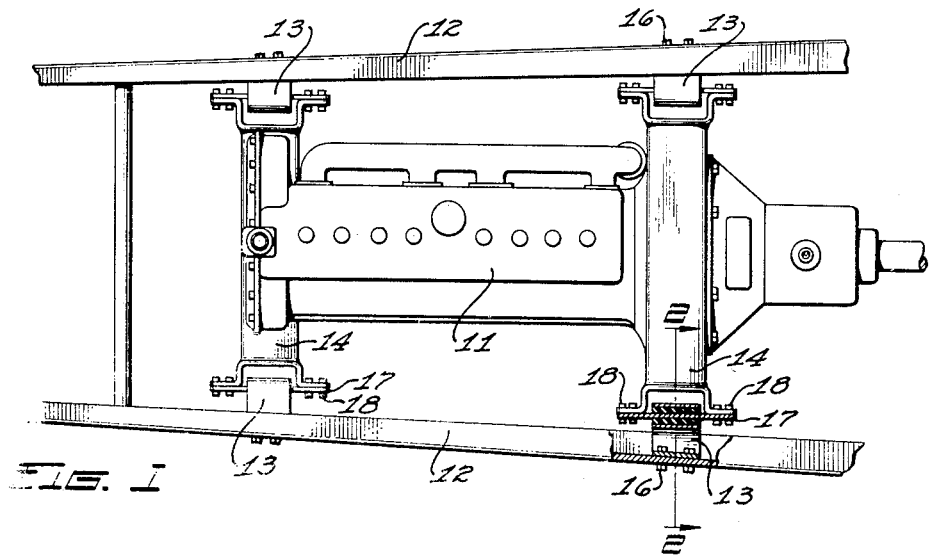
Fig. 1
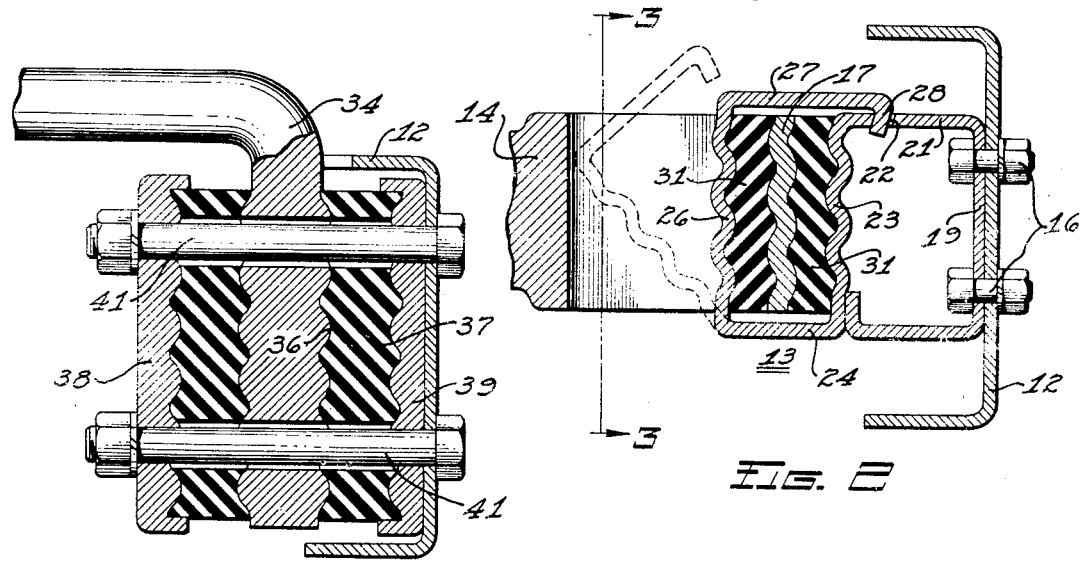
Fig. 4
Fig. 2
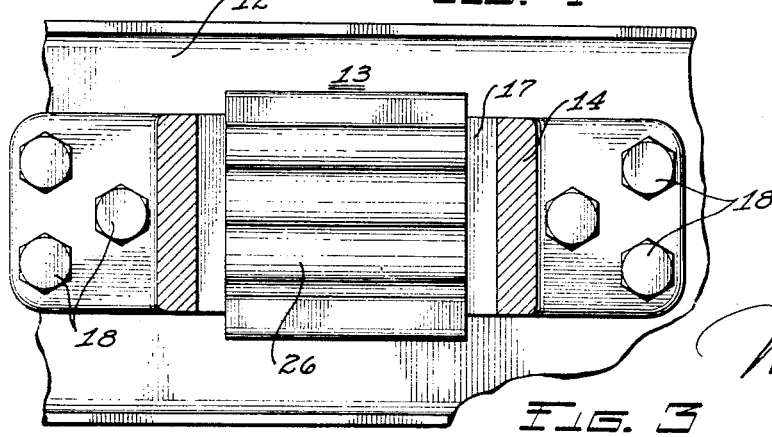
Fig. 3
Inventor
Milton Tibbetts Patented Oct. 10, 1933

1,930,067

UNITED STATES PATENT OFFICE 1,930,067

MOTOR VEHICLE

Milton Tibbetts, Detroit, Mich., assignor to Packard Motor Car Company, Detroit, Mich., a corporation of Michigan Application October 15, 1931. Serial No. 569,032

5 Claims. (Cl. 248—14.2)

This invention relates to motor vehicles and more particularly to mountings for the motors of such vehicles.

An important object of motor mounting developments has been to provide a construction which will support the motor in the vehicle frame without transmitting motor vibration to the frame. Resilient mountings capable of absorbing the vibrations have been developed and a great many of such mountings have used rubber to provide the resiliency required. It has also been discovered that the objectionable vibrations of the motor are of the nature of oscillations of the motor about the longitudinal axis thereof, and that these can best be damped out by having the resilient material placed in shear by the motor movement resulting from such vibrations. It has also been proposed that a resilient material be placed in shear by the weight of the motor.

To place resilient material in shear under a vertical load but at the same time to provide for oscillatory movement of the motor arm has thus been the desired object of many types of motor mountings, but it has been difficult to secure a proper shear resisting bond between the rubber and the opposing faces of the motor arm and the frame.

One way of securing this bond has been to vulcanize the rubber to its adjacent metallic surfaces, and then, in order that the rubber may be readily replaceable in the field, the practice has grown of using metallic inserts between the rubber and the motor arm and between the rubber and the frame, the rubber being vulcanized to the metallic inserts and they in turn being bolted to the motor arm and the frame respectively. Thus when the rubber is to be replaced, the entire mounting bracket consisting of the two metallic inserts and the rubber must be unbolted and replaced.

It is one of the objects of this invention to simplify the present type of motor mounting designed to support the motor by shear in rubber.

Another object of the invention is to improve the serviceability of shear type rubber motor mountings.

Still another object of the invention is to provide a bracket for use in a rubber type motor mounting which will readily permit replacement of the rubber and at the same time provide a shear-resisting bond between the rubber and the adjacent metallic surfaces without vulcanizing.

Other objects of the invention will appear from the following description taken in connection with the drawing, which forms a part of this specification and in which:

Fig. 1 is a plan view of the front end of a motor vehicle showing the motor mounted in the frame in accordance with this invention;

Fig. 2 is a sectional elevation of one of the mounting brackets shown in Fig. 1 and taken on the line 2—2 thereof;

Fig. 3 is a sectional view on the line 3—3 of Fig. 2, and

Fig. 4 is a sectional elevation of a modified form of motor mounting.

The structure shown in Fig. 1 includes a motor 11, supported on a frame 12 by brackets 13 yieldingly attached to motor arms 14. As shown in Fig. 2 the bracket 13 is attached to the frame by bolts 16. Each motor arm has at its end a motor support plate 17 which is secured thereto by bolts 18.

The brackets 13 are similar and each is formed to shape from a one-piece strip of sheet metal formed in section as seen in Fig. 2. It will be noticed that each bracket forms an enclosure and has a supporting face attached to the frame member and also a lateral brace extending from the frame member to support the bottom of the enclosure. Within the enclosure is located the motor arm plate held away from the sides of the enclosure by blocks of resilient material such as rubber.

In detail, each bracket 13 has a side portion 19 bolted to the frame. Extending laterally from the upper edge of this portion is a face 21 with an aperture 22 punched therein. The material of the bracket depends downwardly from the end of this face, then laterally, then up again and back laterally to form the side 23, the bottom 24, another side 26, and the top 27 of the enclosure respectively. Formed integrally with the top is a re-entrant lug 28 adapted to latch with the aperture 22 of the face 21 of the bracket and thereby shut in the enclosure in which is located the motor arm plate 17 and blocks 31 of resilient material.

The motor arm plate 17 and the inner faces of the resilient material are formed with interengaging surface irregularities such as corrugations or the like. These complementary or interengaged irregularities prevent vertical displacement of the motor with respect to the resilient material. Preferably, though not necessarily, the side walls of the enclosures 23 and 26 and the outer faces of the resilient material 31 are also interengagingly corrugated.

In assembling a mounting, the bracket, shaped as shown in dotted line in the drawing, is first bolted to the frame as at 16. Then the motor arm plate 17 with the resilient material held thereon, is lowered into place adjacent the bottom 24 of the enclosure. When the motor arm and the blocks of resilient material have been located, the side 26 and the top 27 of the enclosure are swung to their full line position and the lug 28 is snapped into the opening 22.

The blocks of resilient material are, prior to assembly, of a greater thickness than the space between the side walls and the arm plate, so that when the bracket is locked they are compressed to form a close contact with the motor arm and the sides 23 and 26 of the enclosure. Thus the weight of the motor is supported by shear in the resilient material, between its opposite faces, and any tendency towards vertical movement will be dampened out and eliminated by an internal friction in the rubber.

It should be noticed that the vertical forces involved place the main body of the material in shear only. Moreover, the corrugations of the metal surfaces do not overlap vertically so that there is no liability of metal to metal contact, nor is the main body of the rubber compressed.

It should also be noticed that the corrugations extend longitudinally of the vehicle along the entire contacting faces and therefore no vulcanizing is necessary in order to provide the close bond required.

With the above construction replacement of the resilient material is readily accomplished by unlatching the enclosure and swinging the top 27 and the side 26 to the dotted line position at which time the rubber may be removed and new blocks inserted.

Fig. 4 illustrates a modified form of the invention. As shown the motor arm terminates in an integral vertically depending leg 34 with corrugated surfaces 36. On either side of the leg, or surrounding it, is located a mass of corresponding corrugated resilient material 37. Outside the resilient material are reinforcing plates 38 and 39 corrugated to engage with the adjacent corrugations on the resilient material. Bolts 41 hold the motor arm, the resilient material and the re-inforcing plates together and to the frame, the bolts exerting an adjustable compressing force on the resilient material and the motor arm. The apertures in the motor arm and the resilient material through which the bolts pass are of larger diameter than the bolts themselves and thus the motor arm is free to move vertically, restrained only by shear in the resilient material as in the preferable form of the invention shown in Fig. 2.

By removing the bolts, the material and the reinforcements will readily be removable or replaceable as will be clearly understood from the drawing.

It will thus be evident that I have devised a rubber motor mounting which supports the weight and resists the vibrations of the motor by shear in the rubber. The shearing forces are transmitted thereto by a surface union between the rubber and the metal surfaces adjacent thereto and yet the rubber may be replaced in the field without difficulty and without special tools or vulcanizing operations.

While I have described specific embodiments of my invention, which are deemed to be new and advantageous and may be specifically claimed, it is not to be understood that the invention is limited to the exact details of the constructions, as it will be apparent that changes may be made therein without departing from the spirit or scope of the invention.

Having thus described the invention, what is claimed and desired to be secured by Letters Patent is:

1. A motor support comprising a frame member, a motor arm having a vertically extending portion with corrugated side surfaces, bracket means having walls spaced from the side surfaces of the arm, the surfaces of the bracket walls adjacent the arm being corrugated, resilient members interposed between the adjacent corrugated surfaces of the arm and the bracket walls and fixed to the frame, and means compressing the resilient members laterally between surfaces of the arm and the bracket walls, said compressing means permitting a limited free vertical movement of the arm relative to the bracket means, the resilient members being entirely in shear under vertical load of the motor.

2. A motor support comprising a frame member, a motor arm having a vertically extending portion with corrugated side surfaces, a pair of bracket members on opposite sides of the corrugated surfaces of the motor arm, the surfaces of said bracket members adjacent the arm being corrugated, resilient members interposed between the adjacent corrugated surfaces of the arm and the bracket members, and bolt means extending through the bracket members, the resilient members and the arm and secured to the frame member, said arm and said resilient members having openings therein of greater diameter than the diameter of the bolt means to permit vertical movement of the arm relative to the bracket members.

3. A motor support comprising a frame member, a motor arm having a vertically extending portion with corrugated side surfaces, bracket means composed of a sheet of metal bent to provide two corrugated walls spaced from and parallel with the corrugated motor arm and an overlying locking portion, rubber blocks interposed between the corrugated wall portions of the bracket means and the corrugated motor arm, said overlying locking portion compressing the rubber blocks, and means securing the bracket means to the frame member.

4. A motor support comprising a frame member, a motor arm having a vertically extending portion with corrugated side surfaces, bracket means formed of a single sheet of metal bent to form an enclosure for the motor arm, means securing the bracket means to the frame member, and rubber members between the corrugated sides of the motor arm and the adjacent walls of the bracket means.

5. A motor support comprising a frame member, a motor arm having a vertically extending portion with corrugated side surfaces, bracket means having walls spaced from the side surfaces of the arm, the surfaces of the bracket walls adjacent the arm being corrugated, formed rubber members interposed between the adjacent corrugated surfaces of the arm and the bracket walls, means compressing the resilient members laterally between the adjacent surfaces of the corrugated arm and the corrugated bracket walls, and means securing the bracket means to the frame member, said compressing means permitting a limited free vertical movement of the arm relative to the bracket means with the resilient members entirely in shear under vertical load of the motor.

MILTON TIBBETTS.